(12) United States Patent
Mitsuno

(10) Patent No.: US 11,876,939 B1
(45) Date of Patent: Jan. 16, 2024

(54) POWER MANAGEMENT APPARATUS, POWER MANAGEMENT SYSTEM, AND POWER MANAGEMENT METHOD

(71) Applicant: TOSHIBA TEC KABUSHIKI KAISHA, Tokyo (JP)

(72) Inventor: Keigo Mitsuno, Mishima Shizuoka (JP)

(73) Assignee: Toshiba Tec Kabushiki Kaisha, Tokyo (JP)

( * ) Notice: Subject to any disclaimer, the term of this patent is extended or adjusted under 35 U.S.C. 154(b) by 0 days.

(21) Appl. No.: 17/898,424

(22) Filed: Aug. 29, 2022

(51) Int. Cl.
*G06F 3/12* (2006.01)
*H04N 1/00* (2006.01)

(52) U.S. Cl.
CPC ....... *H04N 1/00896* (2013.01); *H04N 1/0009* (2013.01); *H04N 1/00037* (2013.01); *H04N 1/00835* (2013.01)

(58) Field of Classification Search
None
See application file for complete search history.

(56) References Cited

U.S. PATENT DOCUMENTS

| | | | | |
|---|---|---|---|---|
| 8,938,632 B2 * | 1/2015 | Konosu | ............ | H04N 1/00896 713/320 |
| 9,961,224 B2 * | 5/2018 | Utoh | .................... | G06V 40/103 |
| 2002/0178389 A1 * | 11/2002 | Satoh | ................. | H04N 1/00928 713/310 |
| 2014/0029037 A1 * | 1/2014 | Oyoshi | ............. | H04N 1/00891 358/1.13 |
| 2014/0176977 A1 * | 6/2014 | Morita | .............. | H04N 1/00896 358/1.13 |
| 2018/0176404 A1 * | 6/2018 | Onishi | .................. | G06F 1/3231 |
| 2018/0348843 A1 * | 12/2018 | de Cesare | ............ | G06F 1/3296 |
| 2020/0351415 A1 * | 11/2020 | Okuzono | ............ | G06K 15/406 |
| 2021/0195035 A1 * | 6/2021 | Okazaki | ............. | H04N 1/00087 |
| 2022/0337708 A1 * | 10/2022 | Yamamoto | .......... | H04N 1/0009 |

FOREIGN PATENT DOCUMENTS

JP 2008-099516 A 4/2008

* cited by examiner

*Primary Examiner* — Dung D Tran
(74) *Attorney, Agent, or Firm* — Kim & Stewart LLP

(57) ABSTRACT

A power management apparatus for managing a power supply to an electrical device, includes an interface circuit connectable to a plurality of different types of sensors, and a processor configured to generate first log data of states of each of the sensors in a plurality of periods of a day, acquire from the electrical device second log data of operational states of the electrical device in the periods, generate usage data that associates the operational states of the electrical device with the states of each of the sensors and the periods, using the usage data, determine an expected operational state of the electrical device corresponding to current states of each of the sensors and a current period, and control the power supply based on the expected operational state and a current operational state of the electrical device.

18 Claims, 6 Drawing Sheets

FIG. 4

| COMBINATION No. | SENSOR 71 | SENSOR 72 | SENSOR 73 |
|---|---|---|---|
| 000 | High | High | High |
| 001 | High | High | Low |
| 002 | High | High | ⤒ |
| 003 | High | High | ⤓ |
| 004 | High | Low | High |
| . | . | . | . |
| . | . | . | . |
| 064 | ⤓ | ⤓ | ⤓ |

POWER MANAGEMENT APPARATUS, POWER MANAGEMENT SYSTEM, AND POWER MANAGEMENT METHOD

FIELD

Embodiments described herein relate generally to a power management apparatus, a power management system, and a power management method.

BACKGROUND

In the related art, in order to improve convenience and reduce power consumption, electrical devices often have the function of automatic activation from an idle or sleep state based on a usage history and/or an automatic resume based on output of a human detection sensor.

BRIEF DESCRIPTION OF THE DRAWINGS

FIG. 4 depicts a sensor combination table.

DETAILED DESCRIPTION

In general, according to one embodiment, a power management apparatus for managing a power supply to an electrical device, includes an interface circuit connectable to a plurality of different types of sensors, and a processor. The processor is configured to generate first log data of states of each of the sensors in a plurality of periods of a day, acquire from the electrical device second log data of operational states of the electrical device in the periods, generate usage data that associates the operational states of the electrical device with the states of each of the sensors and the periods, using the usage data, determine an expected operational state of the electrical device corresponding to current states of each of the sensors and a current period, and control the power supply based on the expected operational state and a current operational state of the electrical device.

System Configuration

Figure 1:
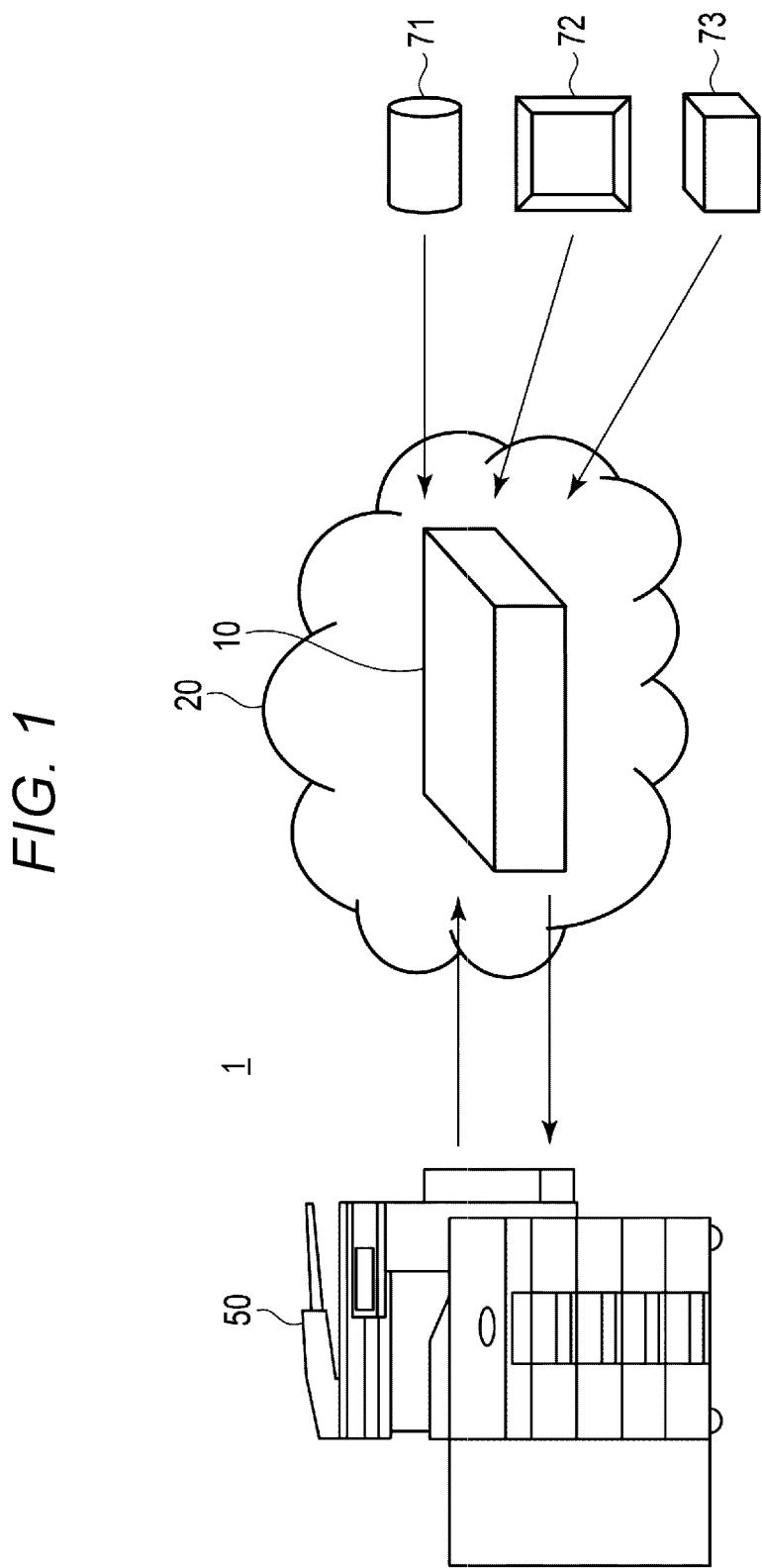
FIG. 1 is a diagram schematically illustrating a power management system.

First, with reference to FIG. 1, a configuration of a power management system 1 according to an embodiment will be described. FIG. 1 is a diagram schematically illustrating an example of the configuration of the power management system 1. The power management system 1 includes an electrical device 50, a power management apparatus 10, and a plurality of types of sensors 71, 72, and 73.

The electrical device 50 is, for example, an image forming device. The image forming device is, for example, a multi-function peripheral (MFP), and has a plurality of functions such as a printing function, a scanning function, and a copying function.

The sensors 71, 72, and 73 are provided outside the electrical device 50. The sensor 71 is, for example, an illuminance sensor that includes a photodiode and detects surrounding brightness in a room in which the electrical device 50 is installed. The sensor 72 is, for example, a mechanical sensor that detects opening and closing of a door. The sensor 73 is, for example, a human detection sensor provided in the vicinity of the door.

Here, three types of sensors 71, 72, and 73 are illustrated, but the number of sensors 71, 72, and 73 is not limited thereto. The power management system may further include another type of sensor, for example, an electric power sensor for sensing electric power supplied to a certain device.

The power management apparatus 10 manages a power supply to the electrical device 50 based on detection information from the sensors 71, 72, and 73. For example, the power management apparatus 10 is located on a cloud server 20. Alternatively, the cloud server 20 executes a function of the power management apparatus 10.

Functional Configuration

Figure 2:
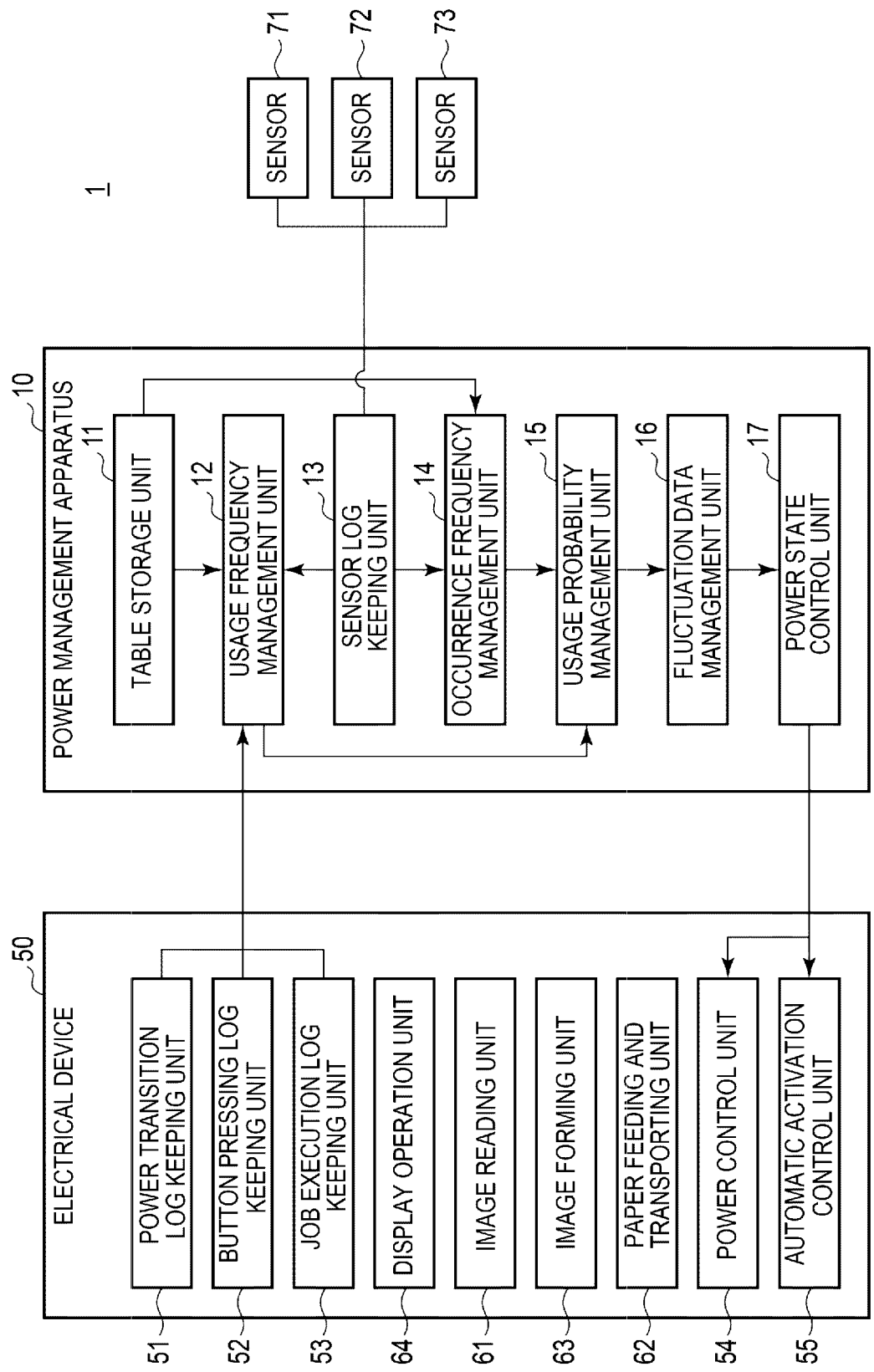
FIG. 2 is a functional block diagram illustrating a power management system.

Next, with reference to FIG. 2, a functional configuration of a power management system 1 according to the embodiment will be described. FIG. 2 is a block diagram illustrating an example of the functional configuration of the power management system 1.

The electrical device 50 has the functions of a power transition log keeping unit 51, a button pressing log keeping unit 52, a job execution log keeping unit 53, a power control unit 54, and an automatic activation control unit 55. For example, those functions are performed by a processor such as a central processing unit (CPU) of the electrical device 50.

The power transition log keeping unit 51 keeps a log of a transition of a power state of the electrical device 50 triggered by a user or automatic control.

The button pressing log keeping unit 52 keeps a log of a pressing operation on an operation button of the electrical device 50 by the user.

The job execution log keeping unit 53 keeps a log of a job executed by the electrical device 50.

The power transition log keeping unit 51, the button pressing log keeping unit 52, and the job execution log keeping unit 53 continue to update the logs, and issue the logs to the power management apparatus 10 for every update.

The power control unit 54 controls the power state of the electrical device 50 according to an instruction from the power management apparatus 10.

The automatic activation control unit 55 sets an automatic activation time according to the instruction from the power management apparatus 10, and switches the power state of the electrical device 50 from an OFF state to an ON state when the automatic activation time is reached.

The electrical device 50 in one embodiment is an image forming device, and includes an image reading unit 61, a paper feeding and transporting unit 62, an image forming unit 63, and a display operation unit 64.

The image reading unit 61 is a sensor such as a contact image sensor (CIS) or a charge coupled device (CCD) to read an image printed on a document or the like and generate the image data.

The paper feeding and transporting unit 62 includes one or more rollers, and takes out a piece of paper from a paper feeding cassette that stores the paper and transports the paper to a paper discharge tray through the image forming unit 63.

The image forming unit 63 includes a photoconductor unit, a toner unit, and the like, and forms an image on the paper transported by the paper feeding and transporting unit 62 using toner based on the image data read by the image reading unit 61 or image data received from an external device.

The display operation unit 64 includes a touch panel, and displays information and receives an instruction to operate the electrical device 50 by the user. For example, the display operation unit 64 displays an icon operation button on the touch panel. Alternatively, the display operation unit 64 includes a hardware push-button operation button.

The power management apparatus 10 performs the function of a table storage unit 11, a usage frequency management unit 12, a sensor log keeping unit 13, an occurrence frequency management unit 14, a usage probability management unit 15, a fluctuation data management unit 16, and a power state control unit 17.

The table storage unit 11 stores a sensor combination table in which combinations of states of by the sensors 71, 72, and 73 are recorded.

The sensor log keeping unit 13 acquires various types of sensor data from the sensors 71, 72, and 73 and keeps logs of the sensor data.

The usage frequency management unit 12 acquires usage frequency data of the electrical device 50 from the electrical device 50, acquires the logs of the sensor data from the sensor log keeping unit 13, and manages the usage frequency data in association with the sensor combination table using the logs of the sensor data. The usage frequency data includes the logs kept by the power transition log keeping unit 51, the button pressing log keeping unit 52, and the job execution log keeping unit 53.

The occurrence frequency management unit 14 acquires the logs of the sensor data from the sensor log keeping unit 13, associates the logs of the sensor data with the sensor combination table, and manages occurrence frequency data of each combination of the states of the sensors 71, 72, and 73.

The usage probability management unit 15 calculates the usage probability data of the electrical device 50 in each combination of the states of the sensors 71, 72, and 73 based on the usage frequency data and the occurrence frequency data and manages the usage probability data.

The fluctuation data management unit 16 acquires the usage probability data from the usage probability management unit 15, and manages the fluctuation data indicating a temporal transition of the usage probability of the electrical device 50 in each combination of the states of the sensors 71, 72, and 73.

The power state control unit 17 determines an optimum power state of a power supply of the electrical device 50 based on the fluctuation data of the usage probability and transmits a power control signal corresponding to the optimum power state to the electrical device 50.

Hardware Configuration

Next, a hardware configuration of the power management apparatus 10 will be described. For example, the power management apparatus 10 is a personal computer, a server computer, or the like.

Figure 3:
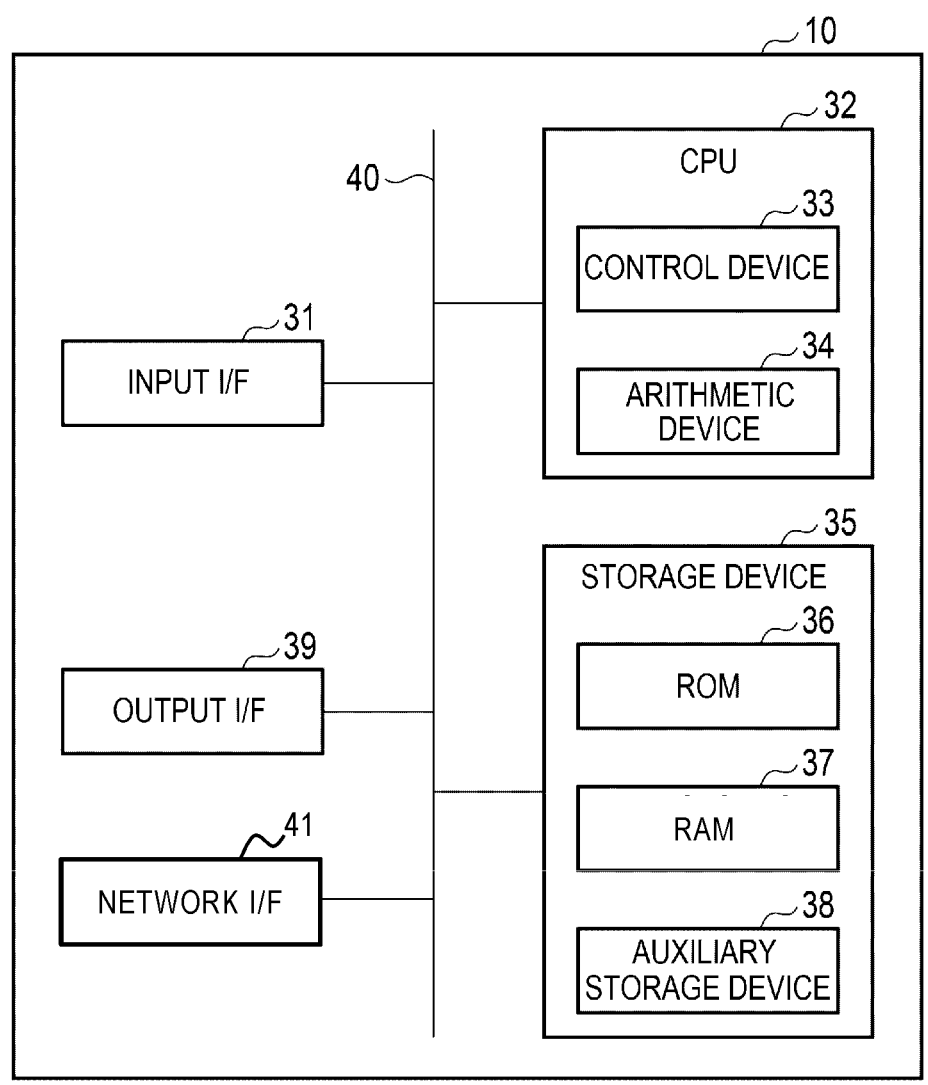
FIG. 3 is a hardware block diagram illustrating a power management apparatus.

FIG. 3 is a hardware block diagram of the power management apparatus 10 according to an embodiment. As illustrated in FIG. 3, the power management apparatus 10 includes an input interface (I/F) 31, a CPU 32, a storage device 35, an output I/F 39, and a network I/F 41. The power management apparatus 10 may further include other peripheral devices in addition to the input I/F 31, the CPU 32, the storage device 35, the output I/F 39, and the network I/F 41.

The input I/F 31, the CPU 32, the storage device 35, the output I/F 39, and the network I/F 41 are electrically connected to one another via a bus 40, and exchange data and commands via the bus 40.

The input I/F 31 is an interface circuit that receives a signal from each of the sensors 71, 72, and 73, that converts the signal into data, and that transfers the data to the CPU 32 and the storage device 35.

The output I/F 39 is an interface circuit that receives the data from the CPU 32 and the storage device 35, that converts the data into a signal, and that outputs the signal.

The network I/F 41 is a network interface circuit that receives and transmits data from and to the electrical device 50 and another external device.

The storage device 35 stores one or more programs and data for processing executed by the CPU 32. The CPU 32 executes various types of processing by reading and executing the programs and data from the storage device 35.

The storage device 35 includes a read-only memory (ROM) 36, a random access memory (RAM) 37, and an auxiliary storage device 38.

The ROM 36 stores a program such as a basic input/output system (BIOS) program executed at the time of activation of the power management apparatus 10.

The RAM 37 stores the programs and data temporarily for the processing of the CPU 32.

The auxiliary storage device 38 stores the programs and the data to be loaded onto the RAM 37 for the processing of the CPU 32. For example, the auxiliary storage device 38 is a non-volatile memory such as a hard disk drive (HDD) or a solid state drive (SSD).

The CPU 32 is a processor, and is hardware that processes data and commands. The CPU 32 includes a control device 33 and an arithmetic device 34.

The control device 33 controls the input I/F 31, the arithmetic device 34, the storage device 35, and the output I/F 39.

The arithmetic device 34 reads programs and data from the RAM 37, executes the programs to process the data, and stores the processed data in the RAM 37.

In such a hardware configuration, the CPU 32 and the storage device 35 operate as the table storage unit 11, the usage frequency management unit 12, the sensor log keeping unit 13, the occurrence frequency management unit 14, the usage probability management unit 15, the fluctuation data management unit 16, and the power state control unit 17.

For example, the CPU 32 loads a program for executing the function of the power management apparatus 10 from the auxiliary storage device 38 onto the RAM 37, and executes the read program to perform acts of the power management apparatus 10.

The electrical device 50 may have the same hardware as the one shown in FIG. 3.

The acts of the power management apparatus 10 are executed by hardware, a combination of hardware and software, or software. For example, the acts are executed as a process or a thread executed on a processor. For example, one or more executable files or applications installed on one or both of the power management apparatus 10 and the electrical device 50 may execute the acts.

The functions described above may be stored in advance in each of the power management apparatus 10 and the electrical device 50, or may be downloaded via a network or a non-transitory computer readable medium. The medium may be in any form such as a disk ROM or a memory card as long as the medium can store a program and can be read by the device. The functions obtained by installation or download in advance as described above may be achieved in cooperation with an operating system (OS) or the like inside the device.

Sensor Combination Table

Next, with reference to FIG. 4, the sensor combination table stored in the table storage unit 11 will be described. FIG. 4 depicts an example of the sensor combination table. The sensor combination table stores a plurality of combinations of states that can be taken by the sensors 71, 72, and 73. The state that can be taken by each of the sensors 71, 72, and 73 includes, for example, a high state, a low state, a state during transition from the high state to the low state, and a state during transition from the low state to the high state.

Acts of Power Management Apparatus 10

Figure 5:
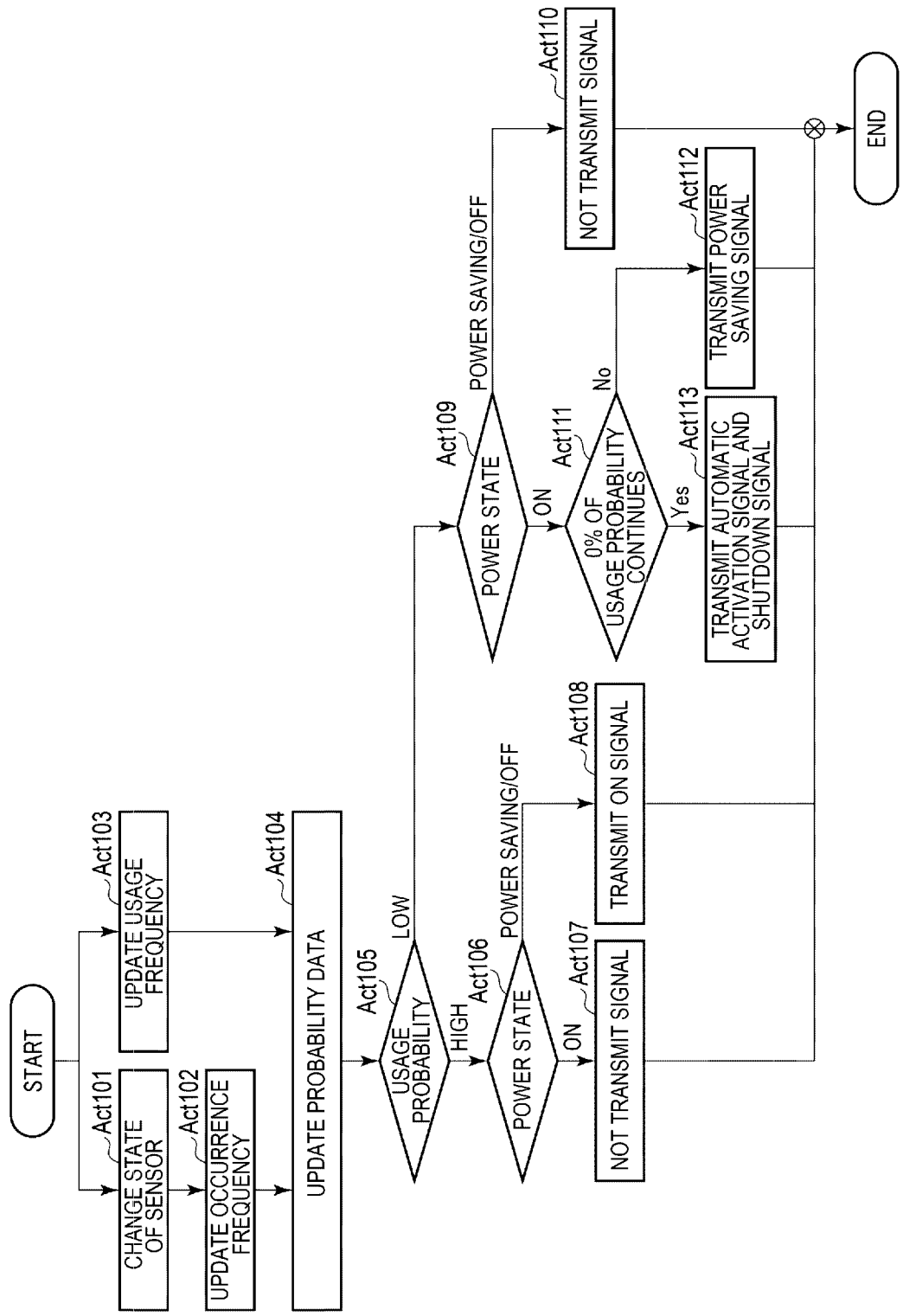
FIG. 5 is a flowchart of acts performed by a power management apparatus.

Next, with reference to FIG. 5, acts of the power management apparatus 10 will be described. FIG. 5 is a flowchart of the acts performed by the power management apparatus 10.

The sensor log keeping unit 13 monitors states of the sensors 71, 72, and 73. When the state of any of the sensors 71, 72, and 73 changes, in Act 101, the sensor log keeping unit 13 detects a change in the states of the sensors 71, 72, and 73. Information on the changed states of the sensors 71, 72, and 73 is then acquired by the usage frequency management unit 12 and the occurrence frequency management unit 14. The usage frequency management unit 12 stores a received combination of the changed states of the sensors 71, 72, and 73.

In Act 102, upon receiving the information on the states of the sensors 71, 72, and 73 after the change, the occurrence frequency management unit 14 reads the sensor combination table from the table storage unit 11, and updates an occurrence frequency of the combination of the sensors 71, 72, and 73 based on the information on the states of the sensors 71, 72, and 73 after the change. The updated occurrence frequency of the combination of the sensors 71, 72, and 73 is then acquired by the usage probability management unit 15.

The power transition log keeping unit 51, the button pressing log keeping unit 52, and the job execution log keeping unit 53 continue to update logs, which are read by the usage frequency management unit 12 of the power management apparatus 10 for every update. When the usage frequency management unit 12 acquires the logs, in Act 103, the usage frequency management unit 12 reads the sensor combination table from the table storage unit 11, and updates, based on the updated log, a usage frequency of a current combination of states of the sensors 71, 72, and 73, that is, the combination of the states of the sensors 71, 72, and 73 stored in Act 101. The updated usage frequency is then acquired by the usage probability management unit 15.

When the usage probability management unit 15 acquires the updated occurrence frequency of the combination of the sensors 71, 72, and 73 or the updated usage frequency, the usage probability management unit 15 updates combination probability data in Act 104. The combination probability data is a usage probability of the electrical device 50 in each combination of the states of the sensors 71, 72, and 73. The updated combination probability data of the sensors 71, 72, and 73 is then acquired by the fluctuation data management unit 16.

Figure 6:
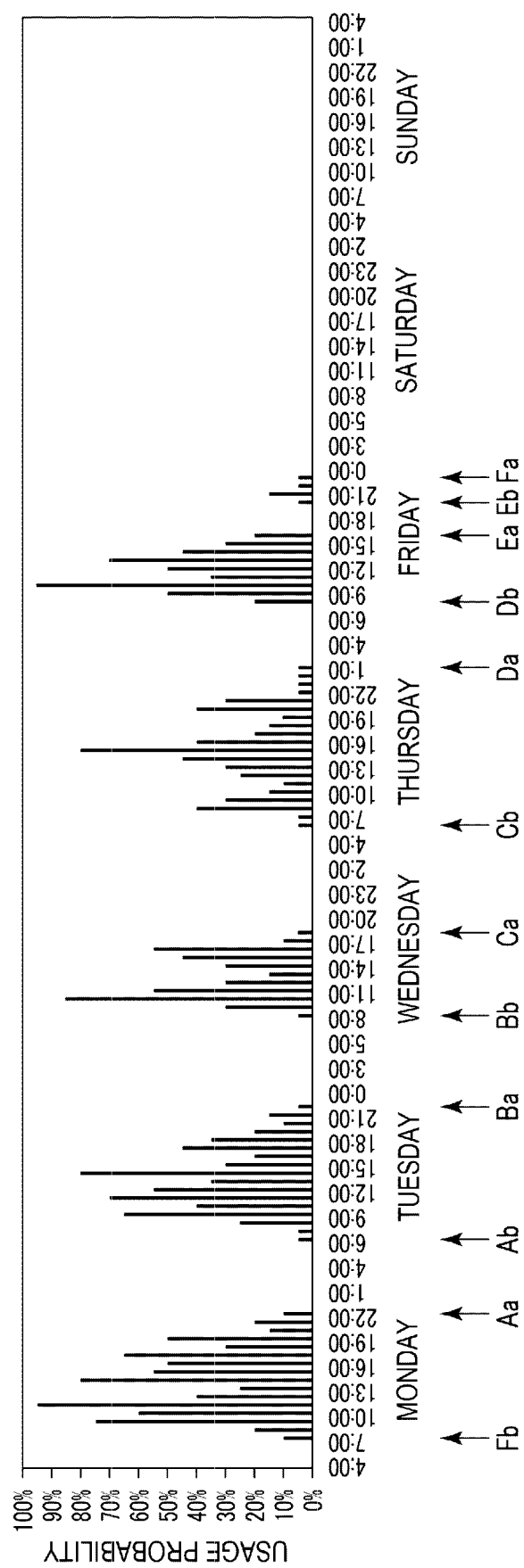
FIG. 6 depicts a graph of usage probabilities of an electrical device.

The fluctuation data management unit 16 manages fluctuation data of the usage probability of the electrical device 50. The fluctuation data of the usage probability of the electrical device 50 indicates a temporal transition of the usage probability of the electrical device 50 in each combination of the states of the sensors 71, 72, and 73. For example, the fluctuation data management unit 16 updates the usage probability of the electrical device 50 in each combination of the states of the sensors 71, 72, and 73 for each of a plurality of time periods (e.g., every three hours) of each day of a week. Here, with reference to FIG. 6, the fluctuation data of the usage probability of the electrical device 50 managed by the fluctuation data management unit 16 will be described. FIG. 6 depicts a graph of the fluctuation data of the usage probability of the electrical device 50 in one of the combinations of the states of the sensors 71, 72, and 73.

In this graph, a usage probability from 22:00 (Aa) on Monday to 6:00 (Ab) on Tuesday is 0. Similarly, a usage probability from 22:00 (Ba) on Tuesday to 8:00 (Bb) on Wednesday is 0. A usage probability from 18:00 (Ca) on Wednesday to 6:00 (Cb) on Thursday is 0. A usage probability from 1:00 (Da) on Friday to 8:00 (Db) on Friday is 0. A usage probability from 16:00 (Ea) on Friday to 20:00 (Eb) on Friday is 0. A usage probability from 23:00 (Fa) on Friday to 7:00 (Fb) on next Monday is 0.

In Act 105, the power state control unit 17 reads the fluctuation data of the usage probability of the electrical device 50 from the fluctuation data management unit 16, and determines whether the usage probability of the electrical device 50 in the current combination of the states of the sensors 71, 72, and 73 is high or low. For example, the power state control unit 17 determines that the usage probability of the electrical device 50 is high when the usage probability exceeds a certain threshold (e.g., 50%). Alternatively, the power state control unit 17 determines that the usage probability of the electrical device 50 is high when the usage probability in a particular time period is relatively higher than the usage probability in another time period or the average of usage probabilities in other time periods.

As a result of the determination in Act 105, if the usage probability of the electrical device 50 is high, in Act 106, the power state control unit 17 determines whether a current power state of the electrical device 50 is an ON state, a power saving state, or an OFF state.

As a result of the determination in Act 106, if the current power state of the electrical device 50 is the ON state, in Act 107, the power state control unit 17 does not issue a power control signal to any of the automatic activation control unit 55 and the power control unit 54 of the electrical device 50. That is, the current power state of the electrical device 50 is an optimum power state.

As a result of the determination in Act 106, if the power state of the electrical device 50 is the power saving state or the OFF state, in Act 108, the power state control unit 17 issues, to the power control unit 54 of the electrical device 50, a power control signal (e.g., an ON signal) for executing instruction to switch the power state of the electrical device 50 to the ON state. That is, the current power state of the electrical device 50 is not the optimum power state, and the optimum power state of the electrical device 50 is the ON state. The power control unit 54 acquires the ON signal and switches the power state of the electrical device 50 to the ON state.

As a result of the determination in Act 105, if the usage probability of the electrical device 50 is low, in Act 109, the power state control unit 17 determines whether the power state of the electrical device 50 is the ON state, the power saving state, or the OFF state.

As a result of the determination in Act 109, when the power state of the electrical device 50 is the power saving state or the OFF state, in Act 110, the power state control unit 17 does not issue the power control signal to any of the automatic activation control unit 55 and the power control unit 54 of the electrical device 50. That is, the current power state of the electrical device 50 is the optimum power state.

As a result of the determination in Act 109, if the power state of the electrical device 50 is the ON state, in Act 111, the power state control unit 17 determines whether the usage probability of the electrical device 50 is 0% in the future and a state in which the usage probability is 0% continues for a predetermined period based on the fluctuation data of the usage probability of the electrical device 50 in each of the plurality of time periods of each day of the week. For example, the future is one hour later, and the predetermined period is two hours. The time described here is merely an example, and is not limited thereto. The future and the predetermined period may be appropriately determined in consideration of a usage pattern of the electrical device 50 and the like.

As a result of the determination in Act 111, if the state in which the usage probability is 0% does not continue for the predetermined period, in Act 112, the power state control unit 17 issues, to the power control unit 54 of the electrical device 50, a power control signal (e.g., a power saving signal) for executing instruction to switch the power state of the electrical device 50 to the power saving state. That is, the current power state of the electrical device 50 is not the optimum power state, and the optimum power state of the electrical device 50 is the power saving state. The power control unit 54 acquires the power saving signal and switches the power state of the electrical device 50 to the power saving state.

As a result of the determination in Act 111, if the state in which the usage probability is 0% continues for the predetermined period, in Act 113, the power state control unit 17 issues, to the automatic activation control unit 55 of the electrical device 50, a power control signal (e.g., an automatic activation signal) for executing instruction to switch the power state of the electrical device 50 from the OFF state to the ON state at the automatic activation time when the usage probability is other than 0% in the future. The automatic activation control unit 55 acquires the automatic activation signal, sets the automatic activation time, and switches the power state of the electrical device 50 from the OFF state to the ON state when the automatic activation time is reached.

Further, the power state control unit 17 issues, to the power control unit 54 of the electrical device 50, a power control signal (e.g., a shutdown signal) for executing instruction to switch the power state of the electrical device 50 to the OFF state. That is, the current power state of the electrical device 50 is not the optimum power state, and the optimum power state of the electrical device 50 is the OFF state. The power control unit 54 acquires the shutdown signal and switches the power state of the electrical device 50 to the OFF state.

For example, it is assumed that the sensor 71 is an illuminance sensor, the sensor 72 is a door opening and closing sensor, and the sensor 73 is a human detection sensor provided in the vicinity of the door. In the fluctuation data of the usage probability of the electrical device 50 in FIG. 6, for example, the usage probability from 22:00 (Aa) on Monday to 6:00 (Ab) on Tuesday is 0. Therefore, normally, that is, if there is no person, near 22:00 (Aa) on Monday, the power state control unit 17 is to be set to automatically activate the electrical device 50 at 6:00 (Ab) on Tuesday in the next morning in Act 109, Act 111, and Act 113, and shuts down the electrical device 50.

However, if the illuminance sensor of the sensor 71 is in a high (the room is bright) state, since a person is exceptionally present at that time and the usage probability of the electrical device 50 is high, the shutdown of the electrical device 50 is postponed in Act 105, Act 106, and Act 107.

Thereafter, if a value of the sensor 71 changes to a low (the room is dark) state, the determination is executed again according to the flowchart in FIG. 5, and the power state control unit 17 is set to automatically activate the electrical device 50 at 6:00 (Ab) on Tuesday in the next morning, and shuts down the electrical device 50. At this time, it is clear from the change in the states of the door opening and closing sensor of the sensor 72 and the human detection sensor of the sensor 73 that electricity is not simply forgotten to be turned off.

According to the above-described embodiments, at a timing when the electrical device 50 is predicted to be used by the user, the electrical device 50 is already in the ON state, and at a timing when the electrical device 50 is predicted not to be used by the user, the electrical device 50 is in the power saving state or the OFF state. As a result, it is possible to improve convenience for the user while reducing power consumption of the electrical device 50. In addition, since the power state of the electrical device 50 is determined to be switched based on the data of the plurality of types of the sensors 71, 72, and 73, prediction accuracy is improved.

While certain embodiments have been described, these embodiments have been presented by way of example only, and are not intended to limit the scope of invention. Indeed, the novel apparatus and methods described herein may be embodied in a variety of other forms; furthermore, various omissions, substitutions and changes in the form of the apparatus and methods described herein may be made without departing from the spirit of the inventions. The accompanying claims and their equivalents are intended to cover such forms or modifications as would fall within the scope and spirit of the inventions.

What is claimed is:

1. A power management apparatus for managing a power supply to an electrical device installed in a room, the power management apparatus comprising:
   one or more interface circuits connectable to the electrical device and a plurality of different types of sensors installed in the room separately from the electrical device;
   a memory that stores a table indicating a plurality of combinations of states of the sensors, wherein each of the states is one of a high level, a low level, a transition from the high level to the low level, and a transition from the low level to the high level; and
   a processor configured to:
      generate first log data of the states of the sensors in a plurality of periods of a day,
      acquire, from the electrical device, second log data of operational states of the electrical device in the periods, each of the operational states being one of an ON state, an OFF state, and a power saving state,
      generate usage data that associates each of the periods with one of the operational states of the electrical device and one of the combinations indicated by the table stored in the memory,
      using the usage data, determine an expected operational state of the electrical device corresponding to a combination of current states of the sensors and a current period, and
      control the power supply based on the expected operational state and a current operational state of the electrical device.

2. The power management apparatus according to claim 1, wherein the processor is further configured to:
   generate probability data indicating whether the electrical device is likely to be in use or not in use in each period of a day based on the usage data generated during a plurality of days.

3. The power management apparatus according to claim 2, wherein the processor is further configured to:
   issue a signal that causes the electrical device to switch to the ON state when the probability data indicates that the electrical device is likely to be in use in the current period and the current operational state is the power saving state or the OFF state.

4. The power management apparatus according to claim 2, wherein the processor is further configured to:
   issue a signal that causes the electrical device to switch to the OFF state when the probability data indicates that the electrical device is likely to be not in use in the current period and the current operational state is the ON state.

5. The power management apparatus according to claim 1, wherein the processor is further configured to, when the current operational state of the electrical device is the ON state:
   determine, using the usage data, whether the expected operational state is the OFF state and continues over a particular period after the current period, and
   issue a signal that causes the electrical device to switch to the power saving state when the expected operational state is the OFF state and does not continue over the particular period.

6. The power management apparatus according to claim 5, wherein the processor is further configured to:
   issue a signal that causes the electrical device to switch to the OFF state when the expected operational state is the OFF state and continues over the particular period.

7. The power management apparatus according to claim 6, wherein the processor is further configured to:
   issue a signal that causes the electrical device to switch to the ON state after the particular period.

8. The power management apparatus according to claim 1, wherein the sensors include at least one of:
   an illuminance sensor in the room in which the electrical device is installed,
   a mechanical sensor configured to detect opening and closing of a door of the room, and
   a human detection sensor disposed within a particular range of the door.

9. The power management apparatus according to claim 1, wherein the electrical device is an image forming device.

10. A power management system, comprising:
    an image forming device installed in a room;
    a plurality of sensors of different types installed in the room separately from the image forming device; and
    a power management apparatus connectable to the image forming device and the sensors via one or more interface circuits and configured to:
       store in a memory a table indicating a plurality of combinations of states of the sensors, wherein each of the states is one of a high level, a low level, a transition from the high level to the low level, and a transition from the low level to the high level,
       generate first log data of the states of the sensors in a plurality of periods of a day,
       acquire, from the image forming device, second log data of operational states of the image forming device in the periods, each of the operational states being one of an ON state, an OFF state, and a power saving state,
       generate usage data that associates each of the periods with one of the operational states of the image forming device and one of the combinations indicated by the table stored in the memory,
       using the usage data, determine an expected operational state of the image forming device corresponding to a combination of current states of the sensors and a current period, and
       control a power supply to the image forming device based on the expected operational state and a current operational state of the image forming device.

11. The power management system according to claim 10, wherein the power management apparatus is further configured to:
    generate probability data indicating whether the image forming device is likely to be in use or not in each period of a day based on the usage data generated during a plurality of days.

12. The power management system according to claim 11, wherein the power management apparatus is further configured to:
    issue a signal that causes the image forming device to switch to the ON state when the probability data indicates that the image forming device is likely to be in use in the current period and the current operational state is the power saving state or the OFF state.

13. The power management system according to claim 11, wherein the power management apparatus is further configured to:
    issue a signal that causes the image forming device to switch to the OFF state when the probability data indicates that the image forming device is likely to be not in use in the current period and the current operational state is the ON state.

14. The power management system according to claim 10, wherein the power management apparatus is further configured to, when the current operational state of the image forming device is the ON state:
    determine whether the expected operational state is the OFF state and continues over a particular period after the current period using the usage data, and
    issue a signal that causes the image forming device to switch to the power saving state when the expected operational state is the OFF state and does not continue over the particular period.

15. The power management system according to claim 14, wherein the power management apparatus is further configured to:
    issue a signal that causes the image forming device to switch to the OFF state when the expected operational state is the OFF state and continues over the particular period.

16. The power management system according to claim 15, wherein the power management apparatus is further configured to:
    issue a signal that causes the image forming device to switch to the ON state after the particular time period.

17. The power management system according to claim 10, wherein the sensors include at least one of:
    an illuminance sensor in the room in which the image forming device is installed,
    a mechanical sensor configured to detect opening and closing of a door of the room, and a human detection sensor disposed within a particular range of the door.

18. A power management method for managing a power supply to an electrical device installed in a room, the method comprising:

storing in a memory a table indicating a plurality of combinations of states of a plurality of different types of sensors installed in the room separately from the electrical device, wherein each of the states is one of a high level, a low level, a transition from the high level to the low level, and a transition from the low level to the high level;

generating first log data of the states of the sensors in a plurality of periods of a day;

acquiring from the electrical device second log data of operational states of the electrical device in the periods, each of the operational states being one of an ON state, an OFF state, and a power saving state;

generating usage data that associates each of the periods with one of the operational states of the electrical device and one of the combinations indicated by the table stored in the memory;

using the usage data, determining an expected operational state of the electrical device corresponding to a combination of current states of the sensors and a current period; and controlling the power supply based on the expected operational state and a current operational state of the electrical device.

\* \* \* \* \*